Aug. 18, 1953 — R. R. BLAIR — 2,649,560
MOTOR SYSTEM FOR CONTROLLING PRESSURE
Filed May 17, 1951 — 2 Sheets-Sheet 2
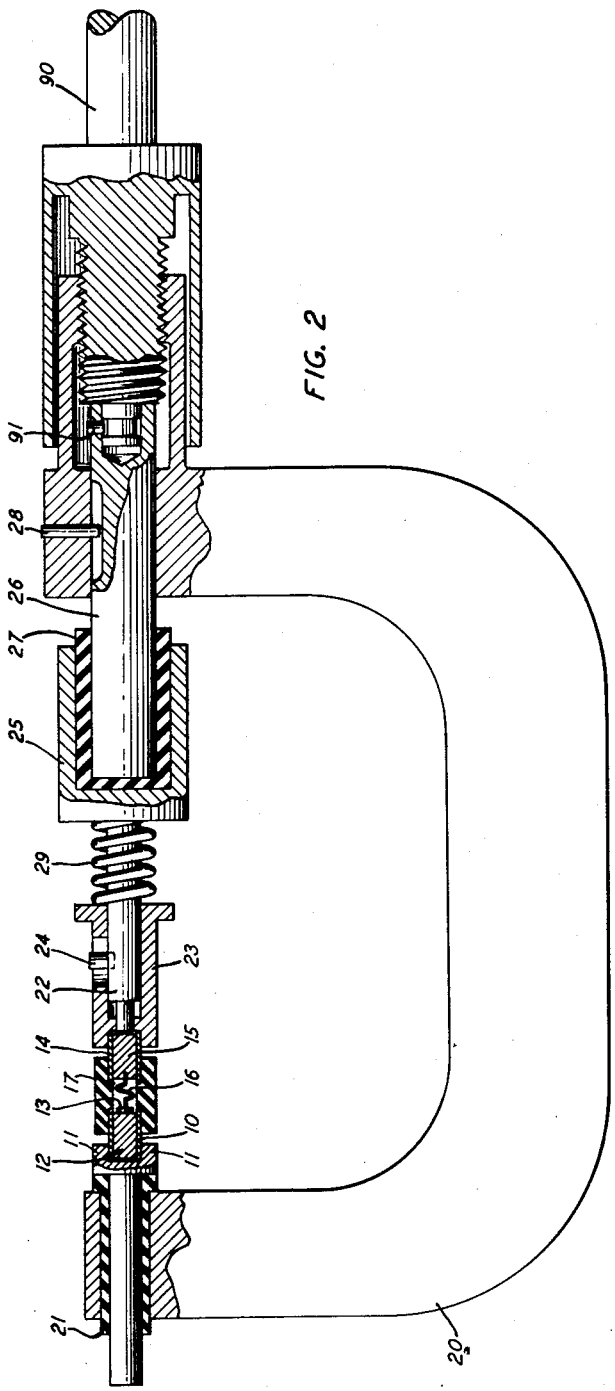
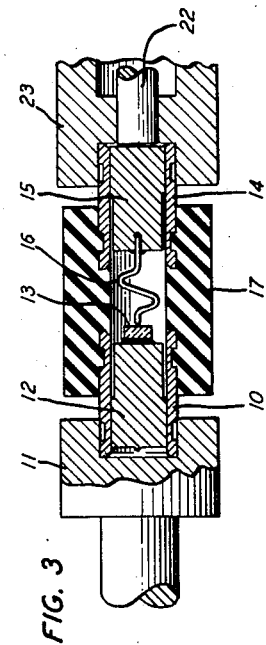
INVENTOR
R. R. BLAIR
BY
ATTORNEY Patented Aug. 18, 1953

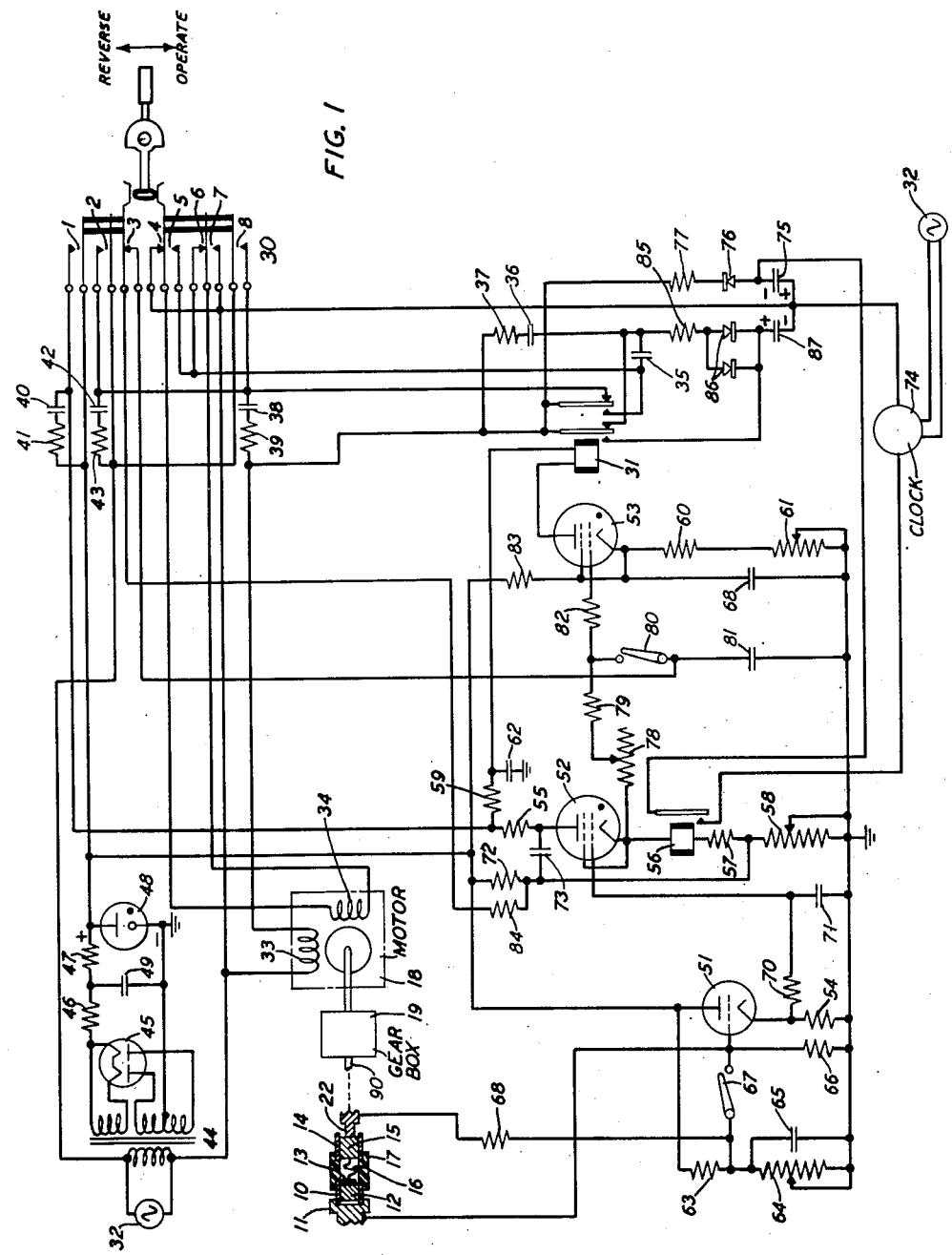

2,649,560

UNITED STATES PATENT OFFICE 2,649,560

MOTOR SYSTEM FOR CONTROLLING PRESSURE

Royer R. Blair, Berkeley Heights, N. J., assignor to Bell Telephone Laboratories, Incorporated, New York, N. Y., a corporation of New York Application May 17, 1951, Serial No. 226,895

5 Claims. (Cl. 318—212)

1

This invention relates to pressure controlling apparatus and particularly to motor-driven apparatus for accurately controlling the spring deflection of point contact varistors.

In the process of manufacturing point contact varistors, it has been found necessary to accurately control the contact area across which rectification occurs in order to obtain uniform electrical characteristics. The point contact wire of the varistor, tungsten for example, shaped to form a spring, is chosen to be of softer material than the semiconductor portion of the varistor, silicon or germanium, for example, so that the point of the contact wire is flattened into an area which is proportional to the force exerted upon the semiconductor by the spring-shaped contact wire when deflected.

In accordance with an embodiment of the invention herein shown and described for the purpose of illustration, there are provided a motor-driven means for moving the spring-shaped contact wire into contact with the semiconductor and for further advancing the wire to cause the spring to be compressed and pressure to be applied through the spring contact wire to the semiconductor at the area contact and means for stopping the motor when the contact wire has been in contact with the semiconductor for a predetermined time interval, thereby producing a predetermined deflection of the spring, 0.002-inch for example. The motor is caused to rotate by supplying current from an alternating-current source to its windings through contacts of an electromagnetic relay when de-energized. When energized, the relay operates to disconnect the motor windings from the alternating current source and to complete circuits for supplying to the motor windings direct current preferably from a condenser which has previously been charged by rectified current derived from the alternating-current source, thereby discharging the condenser through the motor windings and causing the motor to stop quickly.

For controlling the energization of the relay to stop the motor there is provided a circuit comprising three grid-controlled space current devices the second and third of which are of the gas-filled type. When the contact wire engages the semiconductor of the varistor, current from a direct-current source flows through a circuit completed by the varistor to cause a direct voltage to be set up and to be impressed upon the control electrode-cathode circuit of the first space current device to increase the space current flowing through its anode-cathode path

2 and a resistor in series, thereby causing an increase of voltage across the resistor. The resistor is connected in the control electrode-cathode circuit of the second space current device to initiate conduction therein in response to the increase of voltage across the resistor. There is provided a circuit having resistance and capacitance in which a direct voltage is set up in response to space current flowing through the anode-cathode path of the second device and a portion at least of said resistance, thereby charging the capacitance. The capacitance is connected in the control electrode-cathode circuit of the third space current device. After a period determined by the time constant of the resistance-capacitance circuit which is adjustable, the voltage across the capacitance reaches an amplitude sufficient to initiate conduction in the third space current device in the space current circuit of which is conneced the winding of the relay, thereby operating the relay and causing the motor to stop quickly. There is also provided a clock for indicating the time interval between the time that the point of the contact wire reaches a surface of the semiconductor and the time that the relay operates for stopping the motor.

Fig. 1 of the accompanying drawing is a diagrammatic view of an apparatus for automatically adjusting the contact pressure between the semiconductor element and the conductor contact element of a varistor which embodies the invention;

Fig. 2 is a view in elevation partly in section of a portion of the driving apparatus of Fig. 1; and Fig. 3 is an enlarged sectional view of a portion of Fig. 2.

Referring to the drawing, there is shown a varistor comprising a metallic tubular terminal element 10 enclosing an interfering axially coincident metallic pin 12 to one end of which is soldered a small wafer 13 of suitably processed semiconducting material such as crystalline silicon or germanium. A second metallic tubular terminal element 14 encloses a second metallic pin 15 to one end of which is soldered a wire 16 of a conducting material softer than the semiconducting element 13, tungsten, for example, shaped to form a spring. The terminal element 10 fits into an anvil 11 of metallic material supported by the frame 20 of a micrometer and insulated therefrom by a bushing 21. The two terminal elements 10 and 14 of the varistor are supported in axial coincidence by a case 17 of insulating material, for example, silica filled Bakelite. In manufacturing the varistor, it is desired to drive the pin 15 through the tubular element 14 to advance the conducting contact wire element 16 toward the semiconductor element 13 to bring an end portion of element 16 into contact with a surface portion of element 13 and to further advance the element 16 to compress the spring element by a predetermined amount to increase the pressure at the contact area. The pointed end portion of the wire element 16 is thus flattened to increase the contact area to a predetermined size determined by the degree of compression of the spring element.

The driving means for the pin 15 and the spring contact element 16 comprises a micrometer device 20, shown in Fig. 2, and a motor 18 for driving the plunger 22 of the micrometer device through reduction gears having a ratio of 25 to 1, for example, in gear box 19. The terminal element 14 of the varistor fits into a recessed portion of a guide member 23 for the plunger 22, a pin 24 secured in the plunger 22 passing through an aperture in guide member 23 to keep the guide member on the plunger 22 and to permit its movement with respect to the plunger so that a varistor may be inserted in the device. The plunger 22 has an enlarged end portion 25 secured to a rod 26 and insulated therefrom by a bushing member 27. The rod 26 is supported by the micrometer frame 20 and is adapted to slide through an opening therein, the rod 26 being prevented from rotating by a pin 28 in the frame 20 engaging an elongated slot in the rod 26. A spring 29 is adapted to move the guide member 23 along the plunger 22 so as to hold the terminal elements 10 and 14 in place in the anvil 11 and the guide 23, respectively. The micrometer shaft 90 has a threaded portion in engagement with an internally threaded portion of the micrometer frame and an annular recessed end portion in engagement with a pin 91 secured in the rod 26. The shaft 90 is driven by the motor 18 through the gearing 19.

There is provided a three-position switch 30 having contacts designated by the numerals 1 to 8, inclusive, and an electromagnetic relay 31. The circuits of Fig. 1 will first be described assuming the switch 30 to be in the "operate" position and the relay 31 to be deenergized. For this condition contacts 1, 2, 4 and 6 are closed and the remaining contacts are open. Closure of switch contact 2 completes a circuit through a contact of relay 31 for supplying current from an alternating-current source 32 to one of the windings 33 of motor 18. A circuit is completed from one side of the alternating-current source 32, through switch contact 4 to one terminal of a second winding 34 of motor 18 and from its other terminal, through switch contact 6, through a condenser 35, through the armatures and contacts of relay 31 and through switch contact 2 to the other side of the alternating-current source 32. Condenser 36 and resistor 37 in series and condenser 38 and resistor 39 in series are provided for reducing sparking at the contacts, respectively, of relay 31, these resistors each having a resistance of 470 ohms and these condensers each having a capacitance of 0.25-microfarad, for example. Condenser 35 may have a capacitance of 4 microfarads, for example. Condenser 40 and resistor 41 in series are provided for reducing sparking across switch contact 1 and condenser 42 and resistor 43 in series are provided for reducing sparking across switch contacts 2 and 8, these resistors each having a resistance of 22 ohms and these condensers each having a capacitance of 0.25-microfarad, for example.

There is provided a rectifier comprising a transformer 44 having a primary winding connected to the alternating-current source 32, a first secondary winding connected to the cathode of a rectifier tube 45 and a second secondary winding the end terminals of which are connected to the anodes, respectively of the tube 45 and a mid-terminal of which is connected to a grounded output terminal of the rectifier. The cathode of tube 45 is connected through resistors 46 and 47 in series, having resistance values of 1500 ohms and 1000 ohms, respectively, to the positive rectifier output terminal, a cold cathode, gas filled voltage regulator tube 48 being connected across the output terminals to minimize voltage changes across the output terminals. A filtering condenser 49 of 80 microfarads is provided in a path connecting a common terminal of resistors 46 and 47 to ground.

There is provided a circuit for controlling the energization of relay 31 comprising space current devices 51, 52 and 53, device 51 being a vacuum tube triode and devices 52 and 53 being gas filled, grid controlled tubes of the type in which space current conduction continues after being started until the voltage of the space current source is reduced to a low value such as zero. Current is supplied from the positive output terminal of rectifier 45 through the space current path of tube 51 and through a resistor 54 of 10,000 ohms to ground. Space current is supplied to tube 52 from the positive output terminal of rectifier 45 through switch contact 1, resistor 55 of 500 ohms, the anode-cathode path of tube 52, relay 56, resistor 57 of 5000 ohms ,and a 2000-ohm rheostat 58 to ground. Space current is supplied to tube 53 from the positive output terminal of rectifier 45, through switch contact 1, resistor 59 of 1000 ohms, relay 31, the anode-cathode path of tube 53, resistor 60 of 2000 ohms and a 2000-ohm rheostat 61 to ground, a condenser 62 of 0.01 microfarad being provided in a path connecting a common terminal of resistor 59 and relay 31 to ground. A condenser 68 of 40 microfarads is connected across resistor 60 and rheostat 61 in series. There is connected to the output terminals of rectifier 45 across constant voltage tube 48 a voltage divider comprising in series a resistor 63 of 50,000 ohms and a 2000-ohm rheostat 64 which is shunted by a 50-microfarad condenser 65. A resistor 66 of 2.7 megohms is provided in a path connecting the control electrode of tube 51 and ground. A normally open microswitch 67 is provided in a path connecting a common terminal of resistor 63 and rheostat 64 to the grid electrode of tube 51, this switch being closed only when the circuit is being adjusted.

When the conducting wire electrode 16 makes contact with the semiconductor element 13, the voltage across rheostat 64 is impressed upon a circuit comprising in series a resistor 68 of 1 megohm, conducting element 16 and the semiconductor element 13 of the varistor, and resistor 66, thereby setting up across resistor 66 and impressing upon the control electrode-cathode circuit of tube 51 a voltage for increasing the space current flowing in tube 51 and thereby increasing the voltage across resistor 54. The control electrode of tube 52 is connected through a resistor 70 of 10,000 ohms to the cathode of tube 51 and through a condenser 71 of 0.01 microfarad to ground. The increase of voltage across resistor 54 causes space current conduction to be initiated in tube 52, thereby increasing the potential of the cathode of tube 52 with respect to ground. Conduction in tube 52 prior to the time that a circuit is completed through the varistor 13, 16 is prevented by the biasing voltage across rheostat 58 to which current is supplied from rectifier 45 through a resistor 72 of 18,000 ohms. A condenser 73 of 0.2 microfarad is connected between the anode of tube 52 and a common terminal of resistor 72 and rheostat 58. There is provided a clock 74 energized by current from alternating-current source 32. The clock is started in response to the energization of relay 56 to cause a direct-current clutch in the clock (not shown) to be energized. With relay 31 de-energized, a circuit is completed from one side of the alternating-current source through a condenser 75 of 80 microfarads, rectifier element 76, a resistor 77 of 400 ohms and through switch contact 2 to the other side of the alternating-current source for causing condenser 75 to be charged. The clutch of clock 74 is energized from the voltage across condenser 75 in response to the energization of relay 56.

There is provided a time constant circuit comprising in series a 5-megohm rheostat 78, a 50,000-ohm resistor 79, normally closed switch 80, a condenser 81 of 1 microfarad, rheostat 58, resistor 57 and relay 56. With switch 80 closed, the control electrode of tube 53 is connected through a resistor 82 of 50,000 ohms to a common terminal of resistor 79 and condenser 81. The control electrode-cathode circuit of tube 53 is normally biased to prevent space current conduction therein due to the current supplied from rectifier 45 through a resistor 83 of 3300 ohms, resistor 60 and rheostat 61 to set up a biasing voltage across resistor 60 and rheostat 61 in series. Space current conduction is initiated in tube 53 when the voltage across condenser 81 reaches a sufficient magnitude. Prior to the time that space current conduction is initiated in tube 52 and when switch 30 is in its "normal" position, condenser 81 is charged to the relatively low voltage across rheostat 58 through a circuit comprising a resistor 84 of 100 ohms and switch contact 3. When the tube 52 becomes conducting, switch 30 being in the "operate" position, the resulting voltage increases across relay 56, resistor 57 and rheostat 58, in series, causes condenser 81 to be charged at a rate determined by the resistance in the charging circuit which may be adjusted by means of the rheostat 78, thereby adjusting the delay interval between the time that conduction is initiated in tube 52 and the time at which the voltage across condenser 81 reaches a sufficient magnitude to cause space current conduction to be initiated in tube 53.

When relay 31 is released and switch 30 is in the "operate" position, a circuit is completed from one side of the alternating-current source, through switch contact 2, through the armatures and contacts of relay 31, through a resistor 85 of 50 ohms, rectifier elements 86 and a condenser 87 of 375 microfarads to cause the condenser to be charged. When the relay 31 is energized in response to conduction being initiated in tube 53, the circuits for supplying alternating current from source 32 to motor windings 33 and 34 are opened, the circuit for charging condenser 87 is opened, and circuits are completed for causing condenser 87 to discharge through the motor windings 33 and 34 for quickly stopping the rotation of motor 18. The time interval during which the motor 18 rotates subsequent to the time that contact is established between the elements 13 and 16 of the varistor can thus be accurately controlled. Moreover, since the motor runs at a substantially constant speed and because of the large reduction ratio between the motor shaft and spring conducting element 16, the movement of element 16 after it contacts the semiconductor 13 can be accurately controlled. Substantially uniform contact pressure and area are thus obtainable in varistors when assembled in accordance with the method described. The energization of relay 31 transfers the charging circuit for condenser 75 from the alternating-current source 32 to charged condenser 87. The polarity of the charge on the latter is such that energy from condenser 87 cannot pass through element 76 to condenser 75. Condenser 75 is thereby effectively disconnected from a charging source without the use of an additional contact on relay 31. The clock quickly stops when the energy in condenser 75 is dissipated through the clock clutch mechanism. The clock thus indicates the time interval elapsing between the time that contact is made between elements 13 and 16 of the varistor and the time that the motor is stopped.

When the switch 30 is in "neutral" position, the energizing circuit for motor winding 33 is incomplete, switch contact 2 being open. For this condition, contact 1 of switch 30 is open and the direct-current supply circuit for tubes 52 and 53 is open and the space-current conduction in these tubes is interrupted. Relays 56 and 31 are thus released. Also for this condition, switch contact 3 is closed to complete a circuit for reducing the charge on condenser 81 to a low value.

When the switch 30 is moved from "neutral" position to the "reverse" position, contact 3 remains closed and contacts 5, 7 and 8 are closed. An energizing circuit for motor winding 33 is completed through switch contact 8 and the closure of contacts 5 and 7 causes the completion of an energizing circuit for motor winding 34. The connections to winding 34 are reversed with respect to the connections which are made when the switch 30 is in the "operate" position. The motor 18 thus runs in reverse to condition the apparatus to permit the removal of the varistor from the apparatus and the insertion of another varistor assembly so that the contact pressure between its semiconductor element and its conductive contact element may be adjusted as above described.

The microswitch 67 is closed to simulate the making of contact between the elements of a varistor when adjusting the timing interval between the closing of the switch 67 and the energization of relay 31 to stop the motor 18. This timing interval may be reduced to a very small value by opening the switch 80 in case it is desired to complete the deflection of the spring conductive element 16 by hand for experimental purposes.

What is claimed is:

1. In combination, a semiconductor element, a conductive element, driving means for bringing said elements into contact and for increasing the contact pressure, means responsive to the making of said contact for setting up a voltage the magnitude of which increases to a predetermined magnitude over a predetermined time period starting at the time of making said contact, and means responsive to said voltage of predetermined magnitude for stopping said driving means when said elements have been in contact for said predetermined period.

2. In combination, a semiconductor element, a conductive element shaped to form a spring, driving means for advancing at a substantially uniform rate one of said elements toward the other to establish a contact between said elements and for compressing the spring-shaped conductive element to increase the contact pressure, a condenser, means for charging said condenser over a time period starting at the time of establishment of said contact, and means responsive to a predetermined charge on said condenser for stopping said driving means a predetermined time period after the initial establishment of said contact.

3. In combination, a semiconductor element, a conductive element shaped to form a spring, driving means coupled to one of said elements comprising a motor, means for energizing said motor to advance at a substantally uniform rate one of said elements toward the other to establish a contact between said elements and to further advance said one element for compressing the spring-shaped conductive element, thereby increasing the pressure at the contact area and flattening the contact portion of the conductive element to increase the contact area, electroresponsive means, means responsive to the establishment of said contact for initiating the energization of said electroresponsive means, and means responsive to said energization of said electroresponsive means for a time period of predetermined length for interrupting said energization of the motor and for simultaneously braking the motor when the elements have been in contact for a predetermined time interval.

4. In combination, a semiconductor element, a wire conductive element of a material softer than said semiconductor element shaped to form a spring, driving means comprising a motor coupled to said conductive element, means for supplying alternating current to said motor to advance said conductive element at a substantially uniform rate to bring an end thereof into contact with a surface portion of said semiconductor element and to further advance said conductive element for increasing the contact pressure and for flattening the contact portion of said conductive element to increase the contact area, a circuit comprising a condenser and resistance in series, means comprising a space-current device for initiating the flow of current in said circuit in response to the establishment of said contact between said semiconductor and said conductive elements to charge said condenser, and means comprising a second space-current device responsive to a predetermined voltage across said condenser for interrupting the supply of alternating current to said motor and for braking said motor to stop it quickly.

5. In combination, a first element, a second element shaped to form a spring, driving means coupled to one of said elements comprising a motor, means for energizing said motor to advance at a substantially uniform rate one of said elements toward the other to establish a contact between said elements and to further advance said one element for compressing the spring-shaped second element, thereby increasing the pressure at the contact area, means responsive to the establishment of said contact for setting up a voltage which increases with time over a voltage range including a voltage of predetermined magnitude during a time period commencing with the time of establishment of said contact, and means responsive to said voltage of predetermined magnitude for interrupting said energization of the motor and for simultaneously braking said motor to stop it quickly.

ROYER R. BLAIR.

References Cited in the file of this patent

UNITED STATES PATENTS

| Number | Name | Date |
|---|---|---|
| 838,191 | Pickard | May 19, 1908 |
| 1,645,720 | Pfanstiehl | Oct. 18, 1927 |
| 2,441,603 | Storks et al. | May 18, 1948 |
| 2,583,009 | Olsen | Jan. 22, 1952 |